United States Patent
Kudo et al.

(10) Patent No.: US 7,097,207 B2
(45) Date of Patent: Aug. 29, 2006

(54) BODY COVER FOR VEHICLE WITH SADDLE SEAT

(75) Inventors: Kazuhiro Kudo, Kawasaki (JP); Tetsuya Nakazawa, Iruma-gun (JP); Tony Schroeder, Torrance, CA (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 145 days.

(21) Appl. No.: 10/669,607

(22) Filed: Sep. 25, 2003

(65) Prior Publication Data

US 2004/0135397 A1    Jul. 15, 2004

(51) Int. Cl.
    *B62D 25/18*    (2006.01)
(52) U.S. Cl. ........................ 280/848; 296/198
(58) Field of Classification Search .................. None
    See application file for complete search history.

(56) References Cited

U.S. PATENT DOCUMENTS

| | | | | |
|---|---|---|---|---|
| 2,059,305 A * | 11/1936 | Best | ............................. | 280/848 |
| 3,879,059 A * | 4/1975 | Gibes | ......................... | 280/848 |
| 4,535,869 A * | 8/1985 | Tsutsumikoshi et al. | .... | 180/311 |
| 4,667,758 A * | 5/1987 | Tamura | ...................... | 180/68.4 |
| 4,781,258 A * | 11/1988 | Tamura | ...................... | 180/68.1 |
| 4,787,470 A * | 11/1988 | Badsey | ......................... | 180/210 |
| 4,878,555 A * | 11/1989 | Yasunaga et al. | .......... | 180/68.3 |
| 5,108,129 A * | 4/1992 | Olsen | ......................... | 280/850 |
| 5,613,710 A * | 3/1997 | Waner | ......................... | 280/848 |
| 6,205,642 B1 * | 3/2001 | Czirmer | .................... | 29/525.13 |
| 6,336,677 B1 * | 1/2002 | Scott | ........................... | 296/198 |
| 6,705,680 B1 * | 3/2004 | Bombardier | .............. | 298/17 R |
| 6,755,155 B1 * | 6/2004 | May | ............................. | 119/400 |
| 2002/0038737 A1* | 4/2002 | Morishita et al. | | |

FOREIGN PATENT DOCUMENTS

JP        62-18379 A    1/1987

* cited by examiner

*Primary Examiner*—Christopher P. Ellis
*Assistant Examiner*—Christopher Bottorff
(74) *Attorney, Agent, or Firm*—Birch, Stewart, Kolasch & Birch, LLP

(57) ABSTRACT

A body cover, for a vehicle with a saddle seat, includes a cover main body disposed at a central part in a lateral direction of the vehicle, and fenders which are provided for covering wheels of the vehicle disposed at lateral sides, and which are attached to the cover main body. The fenders are attached to the cover main body in a state in which abutting surfaces of the fenders abut against side wall surfaces of the cover main body, respectively.

10 Claims, 3 Drawing Sheets

BODY COVER FOR VEHICLE WITH SADDLE SEAT

BACKGROUND OF THE INVENTION

1. Field of the Invention

This invention relates to a body cover for a vehicle with a saddle seat.

2. Description of Related Art

As a technology relating to a body cover for a vehicle with a saddle seat, there has been provided a structure in which the body cover is divided into a central side cover main body in a lateral direction and a pair of fenders covering both right and left wheels and the fenders are fixed to a steering knuckle connected to a suspension arm (refer to Japanese Unexamined Patent Application, First Publication No. Sho 62-18379, for example).

The system disclosed in the aforesaid patent application is constructed such that the fender is fixed to a steering knuckle connected to a suspension arm while the suspension arm is being inserted into the opening part formed at the fender, and this system had a problem that it was necessary to remove the suspension arm from the steering knuckle to cause its handling to be quite troublesome when the fender needs to be replaced with a new one due to breakage or the like, or to be replaced with another fender due to a change into the fender having a different shape or different material quality or different color tone and the like. In addition, this prior art system had a problem that an unsprung mass is increased by an amount corresponding to this fender.

SUMMARY OF THE INVENTION

Accordingly, it is an object of the present invention to provide a body cover for a vehicle with a saddle seat in which the fender can be easily replaced and the unsprung mass can be reduced.

In order to accomplish the above object, the invention provides a body cover for a vehicle with a saddle seat including: a cover main body disposed at a central part in a lateral direction of the vehicle; and fenders which are provided for covering wheels of the vehicle disposed at lateral sides, and which are attached to the cover main body.

According to the body cover described above, the separate fenders are attached to the cover main body at the central side, so that when at least one of the fenders is to be replaced with a new one or replaced with another one different from the former or the like due to breakage or the like, the fender is preferably removed from the cover main body and the suspension arm is not required to be removed from the steering knuckle, resulting in the handling being facilitated. Additionally, since the fenders are attached to the cover main body, the weight of the fenders does not influence the unsprung mass.

In the above body cover for a vehicle with a saddle seat, the cover main body may have side wall surfaces opposing against side surfaces of the wheels, respectively, each of the fenders may have abutting surface capable of being abutted against the side wall surface, and the fenders may be attached to the cover main body in a state in which the abutting surfaces abut against the side wall surfaces, respectively.

According to the body cover described above, the fenders are attached to the cover main body in a state in which the abutting surfaces of the fenders abut against the side wall surfaces of the cover main body opposing against the side surface of the wheel, so that the fixing part between the cover main body and the fender can be covered by the cover main body and the fenders.

In the above body cover for a vehicle with a saddle seat, each of the abutting surfaces may include a first surface and a second surface which intersect each other.

According to the body cover described above, it is possible to ensure a fixing rigidity of the abutting surface with a minimum area because the abutting surface of the fender abutting against the side wall surface of the cover main body forms a substantial L-shape having the first surface and the second surface which intersect each other.

DETAILED DESCRIPTION OF THE INVENTION

Figure 1:
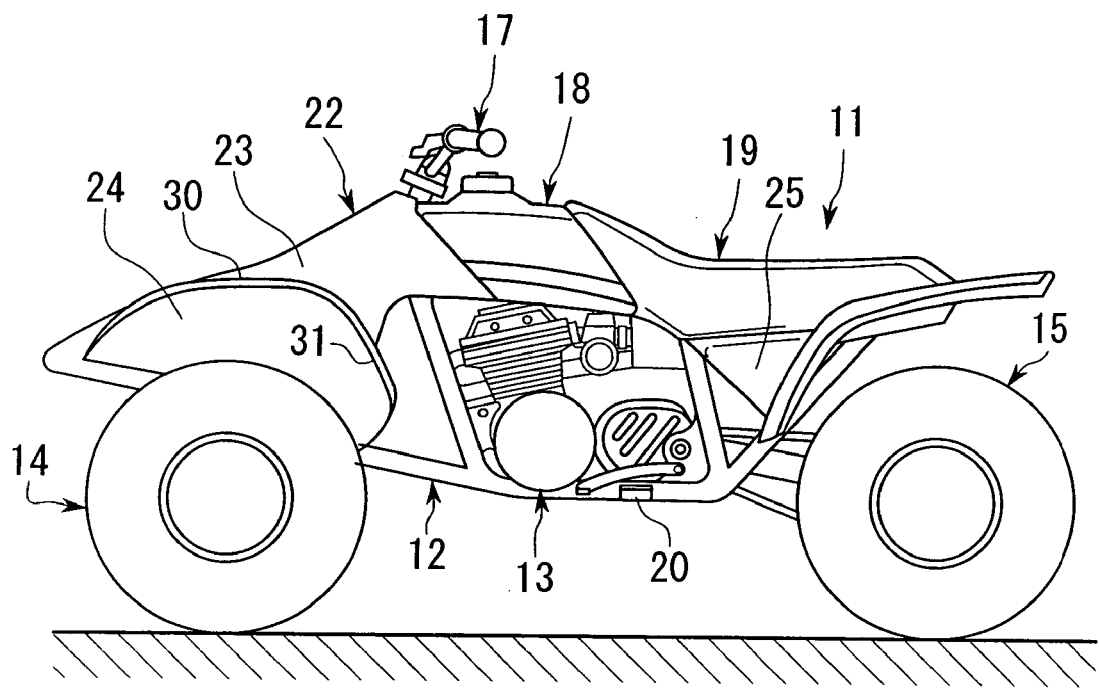
FIG. 1 is a side elevational view for showing a vehicle with a saddle seat to which a body cover structure for the straddling type vehicle of one preferred embodiment of the present invention is applied.

Referring now to the drawings, the body cover for a vehicle with a saddle seat of one preferred embodiment of the present invention will be described below.

FIG. 1 is a side view for showing a vehicle with a saddle seat to which the preferred embodiment of the present invention is applied.

This vehicle with a saddle seat is a so-called four-wheel buggy vehicle. The vehicle includes a vehicle body frame 12 constituting a framework of a vehicle body 11, an engine 13 mounted at a substantial central position of the vehicle body frame 12 in its forward or rearward direction, front wheels (wheels) 14 arranged at both right and left sides of the front section of the vehicle body 11, and rear wheels 15 arranged at both right and left sides of the rear section of the vehicle body 11.

In addition, this vehicle with a saddle seat includes a handlebar 17 installed at a front upper side of the vehicle body 11 to steer the front wheels 14, a fuel tank 18 installed at a central upper section in a forward or rearward direction of the vehicle body 11, a seat 19 installed at a rear side of the fuel tank 18, and steps 20 arranged at both right and left sides of the engine 13 and the like.

Figure 2:
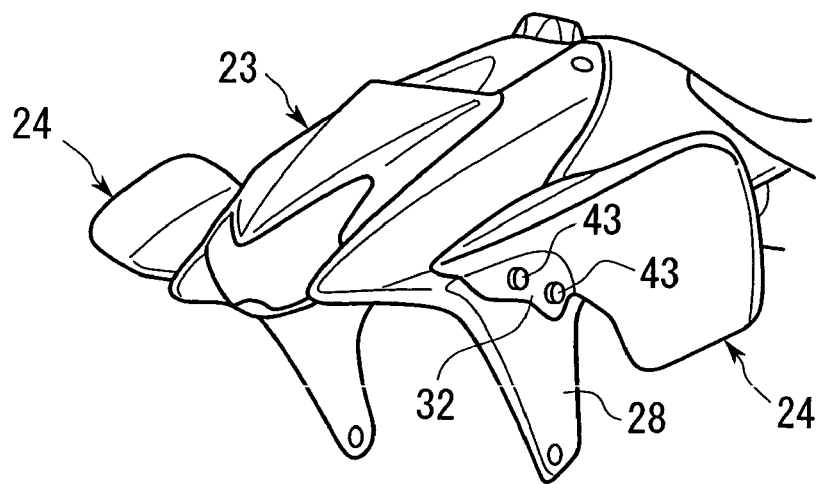
FIG. 2 is a perspective view for showing a body cover for a vehicle with a saddle seat of one preferred embodiment of the present invention.
Figure 3:
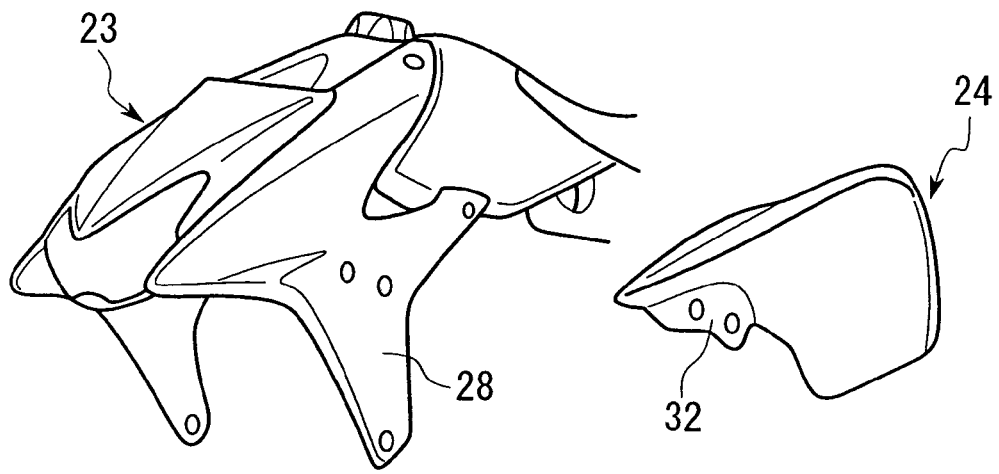
FIG. 3 is an exploded perspective view for showing a body cover for a vehicle with a saddle seat of one preferred embodiment of the present invention.

The body cover 22 constituting the front surface side of the vehicle body 11 in this vehicle with a saddle seat includes a front cover main body 23, a pair of front fenders 24, and a rear cover 25. The front cover main body 23 is arranged at the central part in a lateral direction of the front section of the vehicle body 11 so as to cover the vehicle body frame 12 from upper side and lateral sides thereof. The pair of front fenders 24 and the front cover main body 23 are formed separately as shown in FIG. 3. The pair of front fenders 24 are attached to the front cover main body 23 as shown in FIG. 2 so as to cover both right and left wheels 14. The rear cover 25 is arranged at the rear part of the vehicle body 11 so as to cover the vehicle body frame 12 from above and sides thereof and further to cover both right and left rear wheels 15 as shown in FIG. 1. The seat 19 is mounted at the central part of the rear cover 25 in a lateral direction.

Figure 4:
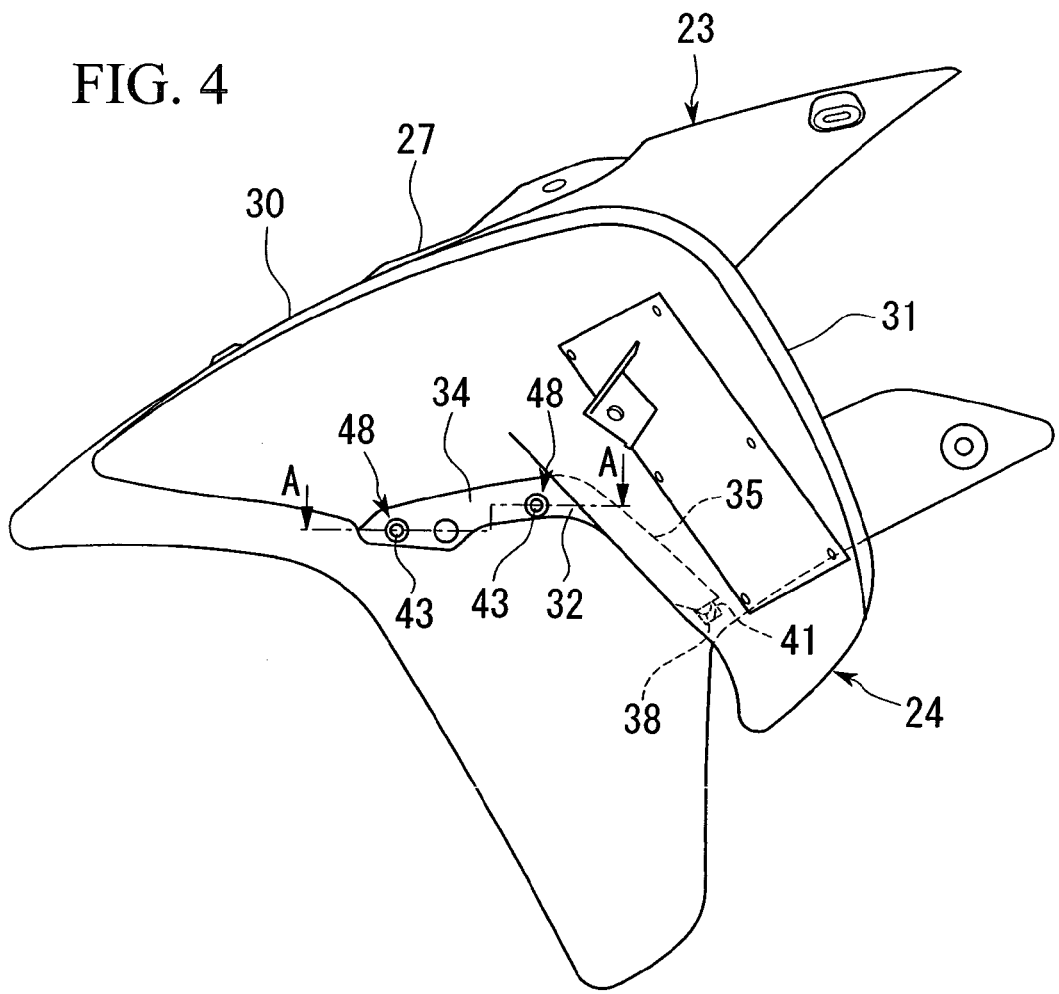
FIG. 4 is a side elevational view for showing a body cover for a vehicle with a saddle seat of one preferred embodiment of the present invention.

As shown in FIG. 4, the front cover main body 23 includes an upper surface 27 slightly inclined to be positioned lower at its front side and to cover the vehicle body frame 12 from above, and side wall surfaces 28 to cover the vehicle body frame 12 from lateral sides and oppositely spaced apart at the inner side surfaces in an axial direction of the front wheels 14. The side wall surfaces 28 extend in a forward or rearward direction of the vehicle body and in an upward or downward direction.

The front fenders 24 arranged to be separate from the front cover main body 23 as described above include upper surfaces 30 inclined to be positioned lower at the front side and positioned lower at the inner side so as to cover the front wheels 14 from above, rear surfaces 31 inclined to be positioned lower at the rear side and positioned lower at the inner side so as to cover the front wheels 14 from the rear side, and abutting surfaces 32 formed at end edges of the front cover main body 23 side of these upper surfaces 30 and rear surfaces 31 while intersecting each other at a right angle in a lateral direction of the vehicle body.

Figure 5:
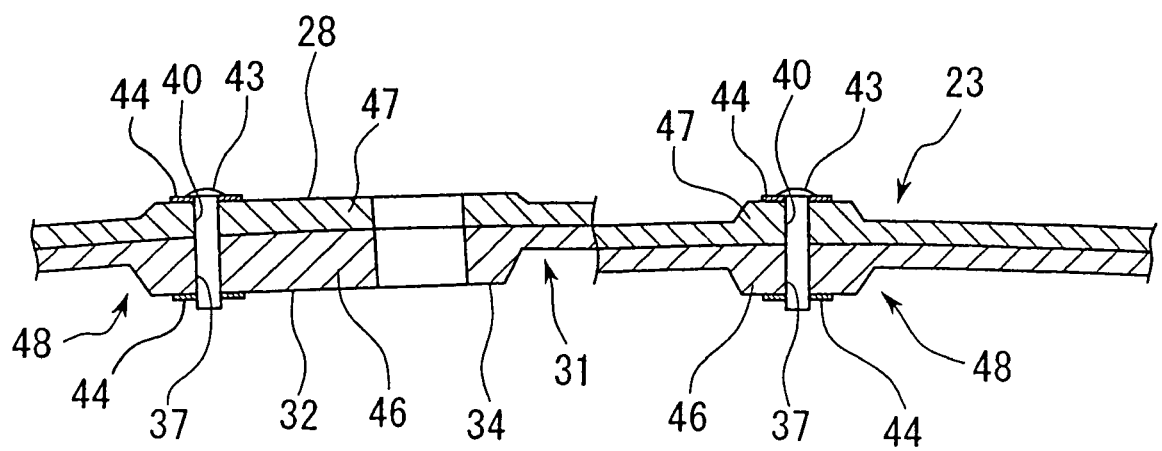
FIG. 5 is a cross-sectional view taken along line A—A in FIG. 4 for showing a body cover for a vehicle with a saddle seat of one preferred embodiment of the present invention.

The abutting surfaces 32 are formed in a substantial L-shape to include a front side first surface 34 extending along a forward or rearward direction of the vehicle body and a rear side second surface 35 extending in a sloping downward direction from the rear end of the first surface 34 in compliance with bent shapes of the upper surface 30 and the rear surface 31 (in other words, including the first surface 34 and the second surface 35 which intersect each other at a right angle). As shown in FIG. 5, the first surface 34 of the abutting surface 32 is formed with fixing holes 37 passing through it in a lateral direction at two forward and rearward locations. In addition, a lower location of the second surface 35 of the abutting surface 32 is formed with an engagement piece 38 shown in FIG. 4 extended in a slant downward direction along the second surface 35 after it is slightly projected toward the front cover main body 23.

As shown in FIG. 5, the front fenders 24 are fixed to the front cover main body 23 in a state in which the abutting surface 32 is abutted against the side wall surface 28. The front cover main body 23 is formed with two fixing holes 40 passing through it in a lateral direction at locations corresponding to the two fixing holes 37 in the front fender 24, and further formed with an inserting section 41 shown in FIG. 4 into which the engaging piece 38 is inserted at a location corresponding to the engaging piece 38 of the front fender 24.

The front fender 24 causes the abutting surface 32 to be abutted against the side wall surface 28 of the front cover main body 23 while the engaging piece 38 is being inserted into the inserting section 41 of the front cover main body 23. The front fender 24 causes the position of the fixing hole 37 to coincide with the position of the fixing hole 40 of the front cover main body 23, and thus the front fender 24 is fixed to the front cover main body 23 by a rivet 43 and a washer 44 inserted into the fixing holes 37 and 40 of which positions coincide with each other.

At this time, the front fender 24 is restricted against motions and rotations in all directions by the two rivets 43 against the front cover main body 23, resulting in the front fender being fixed at a total of three locations of positions of the two rivets 43 and the position of the engaging piece 38 inserted into the inserting section 41. In addition, at this time, the front fender 24 is set such that the substantial L-shaped abutting surface 32 is entirely abutted against the side wall surface 28. Furthermore, as shown in FIG. 5, the peripheral part of the fixing hole 37 at the front fender 24 is to have a thick wall part 46 which has a thicker wall than the peripheral part, and furthermore, the thick wall part 47 is of a more thick than that of the peripheral part of the fixing hole 40 of the front cover main body 23.

In accordance with the preferred embodiment described above, the body cover 22 has a structure in which the separate front fenders 24 are attached to the front cover main body 23 at the central part of the vehicle body 11 in a lateral direction, so that when at least one of the front fenders 24 is to be replaced with a new one due to its breakage or the like, or is replaced with another one due to its changing into the front fender having a different shape, different material quality and different color tone or the like, it is satisfactory that the rivets 43 and the washers 44 be removed to cause the front fender to be removed from the front cover main body 23 and the suspension arm need not be removed from the steering knuckle and handling it becomes quite easy.

Accordingly, a replacement of the front fender 24 becomes easy and repair cost for the front fender 24 can be reduced, and at the same time, cost for changing the front fender 24 so as to adapt for the changing of a cushion stroke of a suspension can be reduced. Furthermore, cost for changing the front fender 24 to change its outer appearance to a preferable one can also be reduced and a degree of freedom in design is improved.

In addition, since the front fenders 24 are attached to the front cover main body 23, the weight of the front fenders 24 does not influence the unsprung mass.

Accordingly, the unsprung mass can also be reduced.

Additionally, since the front fenders 24 are attached to the front cover main body 23 in a state in which the abutting surfaces 32 of the front fenders 24 respectively abut against the side wall surfaces 28 of the front cover main body 23 opposing the inner side surfaces of the front wheels 14, the fixing segment 48 including the rivets 43 and washers 44 for the front cover main body 23 and the front fender 24 can be covered from above by the front cover main body 23 and the front fender 24.

Accordingly, it is possible to prevent the fixing part 48 between the front cover main body 23 and the front fender 24 from being conspicuous and further to improve outer appearance characteristics.

Furthermore, since the front fenders 24 are attached to the front cover main body 23 in a state in which the front fenders 24 respectively abut against the side wall surfaces 28 of the front cover main body 23 by the substantial L-shaped abutting surface 32 having the first surface 34 extending along a forward or rearward direction of the vehicle body and the second surface 35 extending from the rear end part in a sloping downward direction (in other words, having the first surface 34 and the second surface 35 which intersect each other), the abutting surface 32 can ensure a fixing rigidity with a minimum area.

Accordingly, it is possible to reduce the weight of the front fender 24 and at the same time to prevent it from fluttering during running of the vehicle.

In addition, making the front fender 24 as a separate member can reduce the size of the front cover main body 23 and can also reduce the size of the die used to make it.

Figure 6:
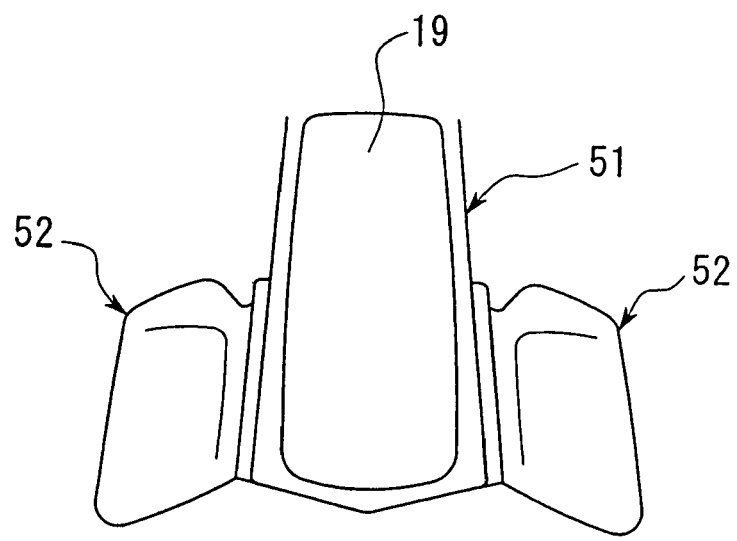
FIG. 6 is a top plan view for showing a case in which a body cover for a vehicle with a saddle seat of one preferred embodiment of the present invention.

With the foregoing arrangement, a case has been described in which the front side of the body cover 22 is divided into the front cover main body 23 at the central side in a lateral direction and a pair of front fenders 24 covering both right and left front wheels 14 and these front fenders 24 are fixed to the front cover main body 23, although it is of course apparent that the rear side of the body cover 22 is divided into both the central rear cover main body 51 in a lateral direction where the seat 19 is fixed and a pair of rear fenders 52 covering both right and left rear wheels and at the same time the rear fender 52 is fixed to the rear cover main body 51 as shown in FIG. 6.

With the foregoing arrangement, the cost for changing the rear fender to change its outer appearance to a preferred one or the like can be reduced in the same manner as in the case of the front fender. In addition, the height of the rear fender is changed to a preferred height in response to a physical condition of the driver to accommodate cases such as one which frequently occurs in which a driver may put his or her hip portion on the rear fender when the waist is moved for a transfer of his or her weight and to steer the handlebar, replacement is facilitated, and the cost for changing it can be reduced.

ADVANTAGEOUS EFFECTS OBTAINABLE BY THE INVENTION

As described above in detail, according to the body cover of the present invention, the separate fenders are attached to the cover main body at the central side, so that when at least one of the fenders is to be replaced with a new one or replaced with another one different from the previous one or the like due to breakage or the like, the fender is preferably removed from the cover main body and the suspension arm is not required to be removed from the steering knuckle, resulting in the handling being facilitated. Additionally, since the fender is fixed to the cover main body, the weight of the fender does not influence the unsprung mass. Accordingly, replacement of the fender can be easily carried out and an unsprung mass can be reduced.

According to another body cover of the present invention, the fenders are fixed to the cover main body in a state in which the abutting surfaces of the fenders abut against the side wall surfaces of the cover main body opposing against the side surfaces of the wheels, so that the fixing part between the cover main body and the fender can be covered by the cover main body and the fender. Accordingly, it is possible to prevent the fixing part between the cover main body and the fender from being conspicuous and further to improve outer appearance characteristics.

According to another body cover of the present invention, it is possible to ensure a fixing rigidity of the abutting surface with a minimum area because the abutting surface of the fender abutting against the side wall surface of the cover main body forms a substantial L-shape having the first surface and the second surface which intersect each other. Accordingly, it is possible to reduce the weight of the fender and at the same time to prevent it from fluttering during running of the vehicle.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A body cover for a vehicle with a saddle seat, comprising:
   a cover main body disposed at a central part in a lateral direction of the vehicle, the cover main body including an upper surface to cover a vehicle body frame from above, and side wall surfaces to cover the vehicle body frame from lateral sides and oppositely spaced apart at inner side surfaces in an axial direction of two front wheels; and
   fenders which are provided for covering the front wheels of the vehicle disposed at lateral sides, and which are attached to the cover main body,
   wherein each of the fenders has an abutting surface abutted against a respective one of the side wall surfaces, and
   the fenders are attached to the cover main body in a state in which the abutting surfaces abut against the side wall surfaces, respectively,
   each of the abutting surfaces includes a front side first surface and a rear side second surface which intersect each other, and
   each of the fenders is fixed to the cover main body by a rivet at a location in a rear portion of the front side first surface and adjacent to a boundary between the front side first surface and the rear side second surface.

2. The body cover for a vehicle with a saddle seat, according claim 1, wherein the front side first surface of the abutting surface is formed with fixing holes passing through it in a lateral direction at two forward and rearward locations, and a lower location of the rear side second surface of the abutting surface is formed with an engagement piece extended in a downwardly slanted direction along the rear side second surface.

3. The body cover for a vehicle with a saddle seat, according to claim 1, wherein each of the fenders is restricted against motions and rotations in all directions by two rivets against the cover main body, resulting in each of the fenders being fixed at three locations of positions of the two rivets and an engaging piece inserted into an inserting section of the cover main body.

4. A body cover for a vehicle with a saddle seat, comprising:
   a cover main body disposed at a central part in a lateral direction of the vehicle, the cover main body including side wall surfaces to cover-the a vehicle body frame from lateral sides and oppositely spaced apart at inner side surfaces in an axial direction of two front wheels; and
   fenders which are provided for covering the front wheels of the vehicle disposed at lateral sides, and which are attached to the cover main body,
   wherein each of the fenders has an abutting surface abutted against a respective one of the side wall surfaces,
   the fenders are attached to the cover main body in a state in which the abutting surfaces abut against the side wall surfaces, respectively,
   each of the abutting surfaces includes a front side first surface and a rear side second surface which intersect each other, and
   each of the fenders is fixed to the cover main body by a rivet at a location in a rear portion of the front side first surface and adjacent to a boundary between the front side first surface and the rear side second surface.

5. The body cover for a vehicle with a saddle seat, according to claim 4, wherein the front side first surface of the abutting surface is formed with fixing holes passing through it in a lateral direction at two forward and rearward locations, and a lower location of the rear side second surface of the abutting surface is formed with an engagement piece extended in a slant downward direction along the rear side second surface.

6. The body cover for a vehicle with a saddle seat, according to claim 4, wherein each of the fenders is restricted against motions and rotations in all directions by two rivets against the cover main body, resulting in each of the fenders being fixed at three locations of positions of the two rivets and an engaging piece inserted into an inserting section of the cover main body.

7. The body cover for a vehicle with a saddle seat, according to claim 4, wherein the side wall surfaces of the cover main body extend downwardly below each of the fenders.

8. A body cover for a vehicle with a saddle seat, comprising:
   a cover main body disposed at a central part in a lateral direction of the vehicle, the cover main body including an upper surface to cover a vehicle body frame from above, and side wall surfaces to cover the vehicle body frame from lateral sides and oppositely spaced apart at inner side surfaces in an axial direction of two front wheels; and
   fenders which are provided for covering the front wheels of the vehicle disposed at lateral sides, and which are attached to the cover main body,
   wherein the side wall surfaces of the cover main body extend downward below each of the fenders,
   each of the fenders has an abutting surface abutted against a respective one of the side wall surfaces,
   the fenders are attached to the cover main body in a state in which the abutting surfaces abut against the side wall surfaces, respectively,
   each of the abutting surfaces includes a front side first surface and a rear side second surface which intersect each other, and
   each of the fenders is fixed to the cover main body by a rivet at a location in a rear portion of the front side first surface and adjacent to a boundary between the front side first surface and the rear side second surface.

9. The body cover for a vehicle with a saddle seat, according to claim 8, wherein the front side first surface of the abutting surface is formed with fixing holes passing through it in a lateral direction at two forward and rearward locations, and a lower location of the rear side second surface of the abutting surface is formed with an engagement piece extended in a downwardly slanted direction along the rear side second surface.

10. The body cover for a vehicle with a saddle seat, according to claim 8, wherein each of the fenders is restricted against motions and rotations in all directions by two rivets against the cover main body, resulting in each of the fenders being fixed at three locations of positions of the two rivets and an engaging piece inserted into an inserting section of the cover main body.

* * * * *